United States Patent
Hulick, Jr. et al.

(10) Patent No.: US 12,386,977 B2
(45) Date of Patent: Aug. 12, 2025

(54) SYSTEM AND METHOD FOR EVALUATING PENETRATION TESTING TOOLS

(71) Applicant: Cisco Technology, Inc., San Jose, CA (US)

(72) Inventors: Walter T. Hulick, Jr., Pearland, TX (US); Ashutosh Kulshreshtha, Cupertino, CA (US); Girish Sivasubramanian, Mountain House, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 217 days.

(21) Appl. No.: 18/052,240

(22) Filed: Nov. 3, 2022

(65) Prior Publication Data

US 2024/0152623 A1    May 9, 2024

(51) Int. Cl.
    *G06F 21/57* (2013.01)
(52) U.S. Cl.
    CPC ...... *G06F 21/577* (2013.01); *G06F 2221/033* (2013.01)
(58) Field of Classification Search
    CPC ... G06F 21/57; G06F 21/577; G06F 2221/033
    See application file for complete search history.

(56) References Cited

U.S. PATENT DOCUMENTS

| | | | |
|---|---|---|---|
| 2017/0093892 A1* | 3/2017 | Prokudin | G06F 21/56 |
| 2019/0034640 A1 | 1/2019 | Abdine et al. | |
| 2019/0258805 A1 | 8/2019 | Elovici et al. | |
| 2020/0106792 A1 | 4/2020 | Louie et al. | |
| 2020/0267883 A1 | 8/2020 | Vishwanath | |
| 2021/0014263 A1* | 1/2021 | Soroush | G06F 21/57 |
| 2022/0286474 A1* | 9/2022 | Kuppa | H04L 63/145 |

FOREIGN PATENT DOCUMENTS

WO    WO-2008014507 A2 *    1/2008    ........... G06F 21/577

OTHER PUBLICATIONS

Nuno Antunes et al., "Evaluating and Improving Penetration Testing in Web Services," 2012 IEEE 23rd International Symposium on Software Reliability Engineering. 1071-9458/12 @ 2012 IEEE, pp. 201-210.

Nuno Antunes et al., "Enhancing Penetration Testing with Attack Signatures and Interface Monitoring for the Detection of Injection Vulnerabilities in Web Services," 2011 IEEE International Conference on Services Computing, 978-0-7695-4462-5/11 @ 2011 IEEE, pp. 104-111.

* cited by examiner

*Primary Examiner* — Kevin Bechtel
(74) *Attorney, Agent, or Firm* — Baker Botts L.L.P.

(57) ABSTRACT

A system and method for evaluating penetration testing tools. In one embodiment, a method includes generating a plurality of instructions, wherein the instructions comprise one or more security vulnerabilities for testing a web server, generating the web server, wherein the web server comprises the plurality of instructions with the one or more security vulnerabilities, receiving a penetration test result from a penetration testing tool executing on the web server, and computing a precision of the penetration testing tool for detecting the one or more security vulnerabilities.

20 Claims, 3 Drawing Sheets

SYSTEM AND METHOD FOR EVALUATING PENETRATION TESTING TOOLS

TECHNICAL FIELD

The present disclosure relates generally to a field of web server security systems and, more particularly, to systems and methods for evaluating penetration testing tools.

BACKGROUND

As application security becomes a paramount concern for organizations, there are many tools available in the market to help with performing a security audit. For web server security testing, penetration testing (PenTest) tools try to identify and exploit security vulnerabilities in web servers, application servers, and the like. Organizations typically select PenTest tools based on vendor reputation, but otherwise do not have objective measures for evaluating PenTest tools.

BRIEF DESCRIPTION OF THE DRAWINGS

For a more complete understanding of the present disclosure and for further features and advantages thereof, reference is not made to the following description taken in conjunction with the accompanying drawings, in which.

DESCRIPTION OF EXAMPLE EMBODIMENTS

Overview

Figure 1:
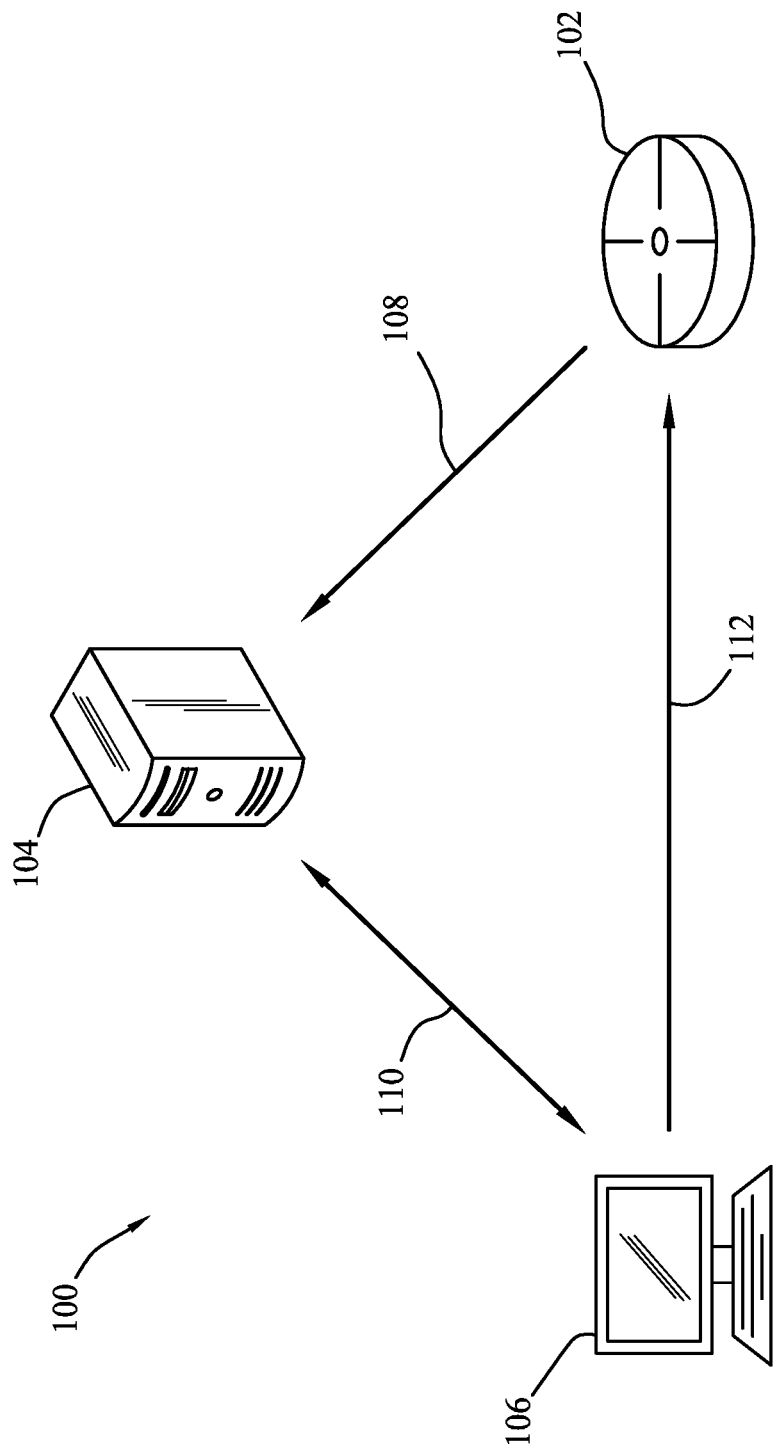
FIG. 1 illustrates an example system for evaluating penetration testing tools, according to some embodiments of the present disclosure.

The conventional approach for selecting a penetration testing (PenTest) tool for auditing a web server, application server, and the like is based purely on vendor reputation, which limits a client's ability to accurately understand the quality of PenTest tools on the market. Certain embodiments as described herein provide a means for evaluating PenTest tools to allow a client to more objectively assess the PenTest tools when selecting one for use on the client's web server.

According to an embodiment, computing the penetration testing tool's precision further comprises determining a quotient of a number of security vulnerabilities correctly identified by the penetration testing tool divided by a total number of security vulnerabilities identified by the penetration testing tool. In some cases, the total number of security vulnerabilities includes false positives identified by the penetration testing tool.

In certain embodiments, the method further includes calculating a confidence score for the penetration testing tool. Calculating the confidence score may further comprise computing a distribution of precision results based on receiving a plurality of penetration test results from the penetration testing tool.

In some embodiments, the method further includes generating a scorecard for the penetration testing tool based at least in part on the computed precision. In some embodiments, the method further includes computing a recall of the penetration testing tool to detect the one or more security vulnerabilities based on determining a quotient of the number of security vulnerabilities correctly identified by the penetration testing tool divided by a total number of security vulnerabilities included in the web server.

According to other embodiments, a system includes one or more processors and one or more computer-readable non-transitory storage media. The one or more computer-readable non-transitory storage media include instructions that, when executed by the one or more processors, cause the system to perform operations including computing the penetration testing tool's precision further comprises determining a quotient of a number of security vulnerabilities correctly identified by the penetration testing tool divided by a total number of security vulnerabilities identified by the penetration testing tool.

According to yet another embodiment, one or more computer-readable non-transitory storage media embody instructions that, when executed by a processor, cause the processor to perform operations including computing the penetration testing tool's precision further comprises determining a quotient of a number of security vulnerabilities correctly identified by the penetration testing tool divided by a total number of security vulnerabilities identified by the penetration testing tool.

Technical advantages of certain embodiments of this disclosure may include one or more of the following. A technical advantage of one embodiment may allow for improved selection of one or more PenTest tools to audit a client web server, application server, and the like. Certain embodiments allow for customized PenTest tool evaluations that simulate one or more security vulnerabilities in order to assess a PenTest tool's ability to accurately detect the one or more security vulnerabilities. Some embodiments may allow for the generation of a distribution score for an evaluated PenTest tool based on the results of numerous evaluations of the PenTest tool, allowing for a more reliable assessment of the PenTest tool based on its performance over a number of evaluations. Another technical advantage of certain embodiments of this disclosure is that the web servers, application servers, and the like that host the simulated vulnerabilities will not be available to the developers of the evaluated PenTest tools before an evaluation, resulting in a more reliable evaluation of the PenTest tools. Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figure 2:
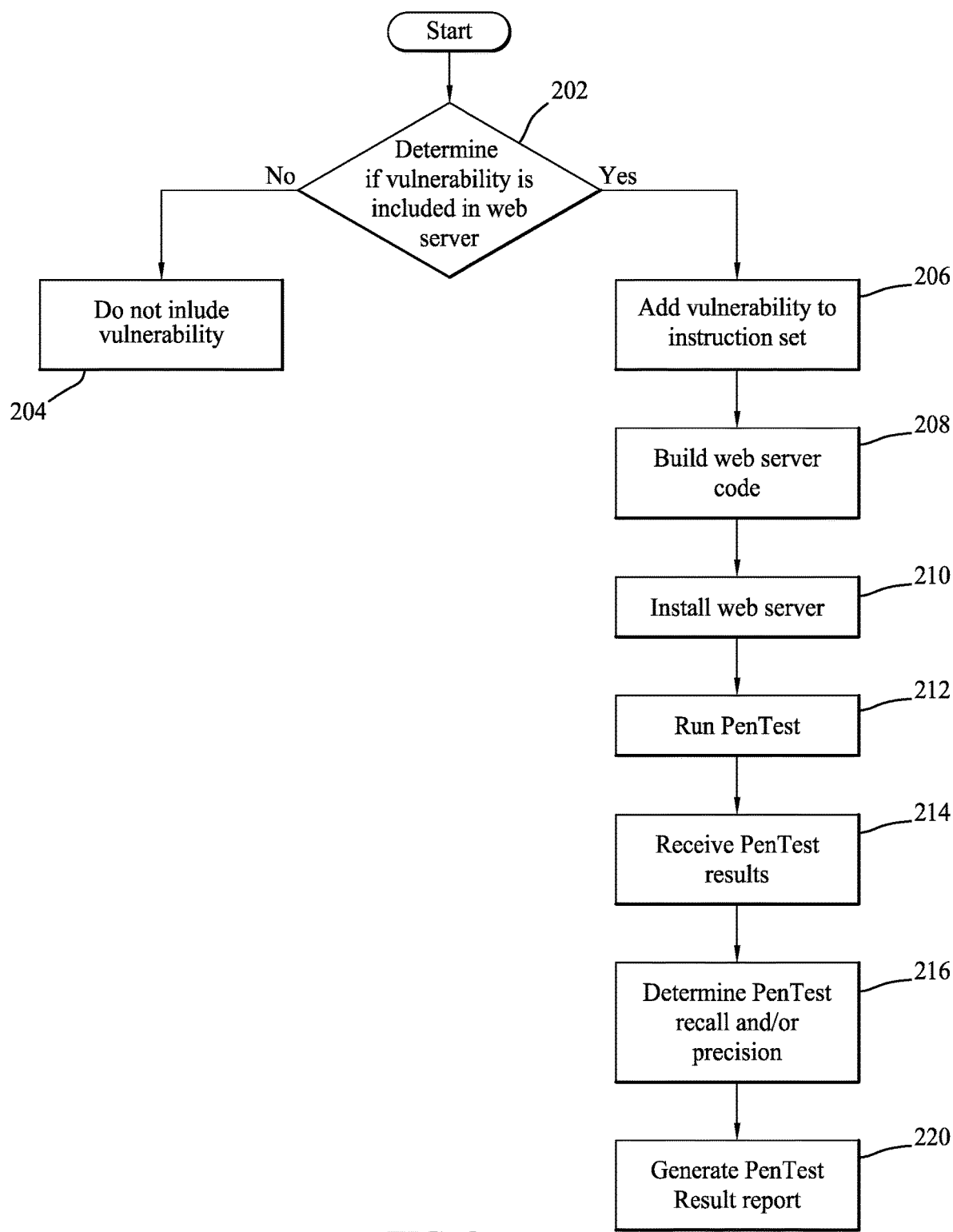
FIG. 2 illustrates and example method for evaluating penetration testing tools, according to some embodiments of the present disclosure.
Figure 3:
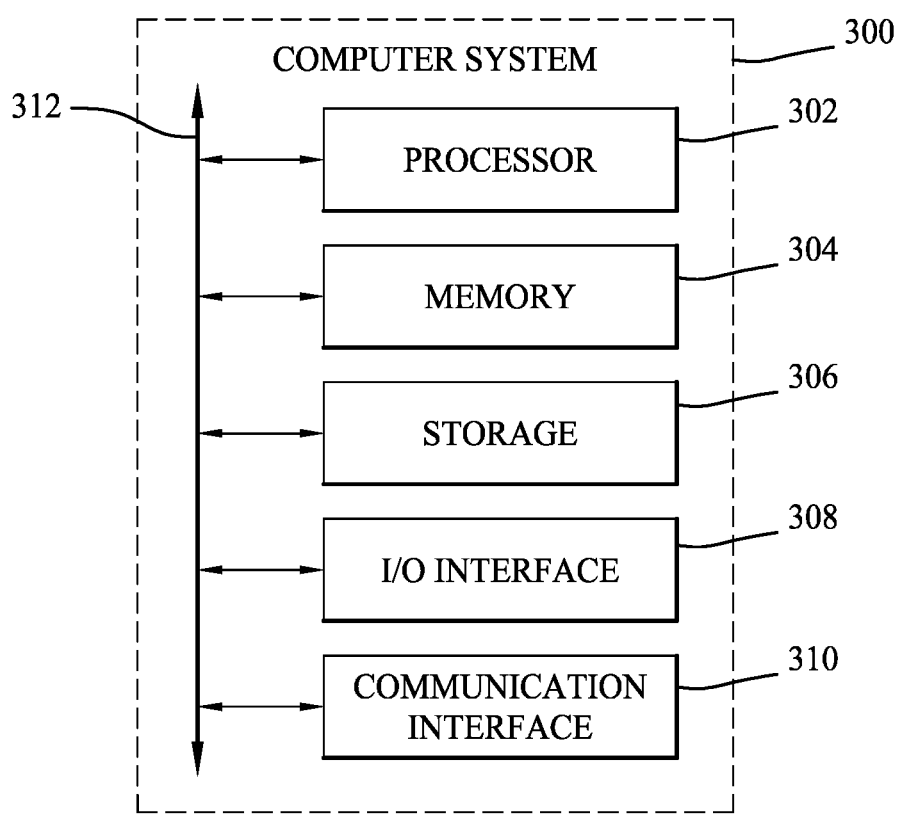
FIG. 3 illustrates an example of a computer system, according to some embodiments of the present disclosure.

This disclosure describes systems and methods for evaluating penetration testing (PenTest) tools. FIG. 1 illustrates an example system for evaluating penetration testing tools, in accordance with certain embodiments. FIG. 2 illustrates an example method for evaluating penetration testing tools, in accordance with certain embodiments. FIG. 3 illustrates an example of a computer system, in accordance with certain embodiments.

A client may provide users access to the client's application server, web server, or the like, which allows a user to request, access, or otherwise interact with content provided by the client. Depending on how the code for the web server or application server is developed, however, the web server or application server may include one or more security vulnerabilities, which may allow a user to improperly access information in the server or otherwise maliciously interact with the server, for example. In an effort to audit their servers for such security vulnerabilities, clients often use penetration testing (PenTest) tools, which simulate a cyberattack on the server with the goal of identifying security vulnerabilities of the server. Accurate and reliable identification of security vulnerabilities is paramount for clients hosting such application servers and/or web servers (and the like) in light of increasing security standards demanded by users. However, there currently exists no objective means for evaluating the various PenTest tools available on the market, so clients typically select a PenTest tool based on vendor reputation. Because every PenTest tool is different, this may result in the selection of a PenTest tool that offers worse performance for identifying a particular security vulnerability compared to other PenTest tools, resulting in a less-than-optimal security audit for the client. Certain embodiments as described herein describe systems and methods for evaluating PenTest tools, allowing clients to more objectively assess and select PenTest tools to run security audits of the clients' web servers, application servers, and the like.

FIG. 1 is an illustration of an example system 100 for evaluating penetration testing tools, according to particular embodiments. The components of system 100 may include any suitable combination of hardware, firmware, and software. For example, the components of system 100 may use one or more elements of the computer system of FIG. 3. In the illustrated embodiment, system 100 includes security application 102, server 104, and PenTest tool 106. In certain embodiments, security application 102 generates a plurality of instructions for a web server, wherein the instructions include one or more security vulnerabilities. Security application 102 installs these instructions on server 104 (as shown at step 108), such that a web server (or similar server, such as an application server) is generated on server 104 according to the plurality of instructions. Accordingly, the generated web server may include the one or more security vulnerabilities indicated by the instructions generated by security application 102. PenTest tool 106 then executes on the web server that was generated on server 104 (as shown at step 110) and identifies one or more of the one or more security vulnerabilities. Security application 102 then retrieves the one or more security vulnerabilities identified by PenTest tool 106 (as shown at step 112). Security application 102 then computes the performance of PenTest tool 106 based at least in part on the security vulnerabilities identified by PenTest tool 106.

Security application 102 represents any suitable system or device configurable to generate instructions for creating a web server, application server, or the like. In some embodiments, security application 102 may generate one or more instructions for creating a web server (or similar server, such as an application server). Such instructions may comprise one or more security vulnerabilities, such that a web server created according to the instructions includes the one or more security vulnerabilities. In some cases, the security vulnerabilities that may be implemented as instructions by security application 102 may correspond to one or more security vulnerabilities listed in the National Vulnerability Database (NVD) or one or more security vulnerabilities listed by the Open Web Application Security Project (OWASP) in its Top Ten list that identifies some of the most critical security risks to web applications. Security application 102 may use any known system or method to generate instructions. In some cases, security application 102 may record application context associated with a security vulnerability, which may indicate the security vulnerability's call path in generated code, the particular thread in which the security vulnerability is located, the business risk associated with the security vulnerability, and other information.

In some embodiments, security application 102 may generate the instructions based on input from a user. For example, a user may wish to evaluate PenTest tool 106's ability to detect a particular security vulnerability. Accordingly, the user may instruct security application 102 to include instructions that, when compiled on server 104, create a web server that includes the particular security vulnerability desired by the user. In some cases, the user may select from one or more vulnerability profiles, where a vulnerability profile represents a collection of particular security vulnerabilities that may, for example, be related based on one or more factors. When the user selects a vulnerability profile, he or she instructs security application 102 to generate instructions that include the one or more security vulnerabilities comprising the selected vulnerability profile. Accordingly, the user may be able to customize the particular security vulnerabilities that are included in a web server that is later tested by PenTest tool 106. This may be especially useful for users that want to evaluate PenTest tool 106 for its ability to identify particular security vulnerabilities.

Security application 102 may generate a web server according to the one or more instructions generated at security application 102. Server 104 represents any suitable operating system configurable to process data and interface with various hardware and associated software components described herein. Server 104 also represents any suitable operating system configurable to operate as a client and server and perform standard operating system and client and server functionality. Server 104 also represents any suitable operating system configurable with applications necessary for development and production of software applications. In some cases, server 104 may be a virtualized server (e.g., a cloud-based server). In addition, server 104 represents any suitable operating system configurable to operate instructions received from security application 102 and generate the associated web server, application server, or the like. Once the web server, application server, or the like is generated on server 104 according to the instructions from security application 102, PenTest tool 106 may execute on the generated web server, application server, or the like.

PenTest tool 106 represents any suitable system, device, operating system, or application configurable for performing a cyberattack on a target web server, application server, and the like. PenTest tool 106 may be an application stored on a computing device (e.g., a laptop or a personal computer) and executable to identify security vulnerabilities in a web server, application server, or the like hosted on server 104. PenTest tool 106 may be provided by a vendor, e.g., a third-party company that develops and sells PenTest tool 106. After a web server, application server, or the like is created at server 104 according to the instructions generated by security application 102, PenTest tool 106 may execute on the web server, application server, or the like and identify one or more security vulnerabilities.

After PenTest tool 106 executes on the web server, application server, or the like generated on server 104 and identifies one or more security vulnerabilities, security application 102 may receive the one or more security vulnerabilities identified by PenTest tool 106. In some cases, security application 102 may scan PenTest tool 106 and derive the one or more security vulnerabilities, and/or information associated with the one or more identified security vulnerabilities, identified by PenTest tool 106. In other cases, PenTest tool 106 may transmit the one or more identified security vulnerabilities, and/or information associated with the one or more identified security vulnerabilities, to security application 102. Security application 102 may then evaluate the performance of PenTest tool 106 based at least in part on the security vulnerabilities identified by PenTest tool 106. In some cases, security application 102 may determine whether a security vulnerability identified by PenTest tool 106 is truly a security vulnerability or if it is merely a false positive.

In some embodiments, security application 102 may determine the precision of PenTest tool 106. The precision of PenTest tool 106 may be the quotient the number of security vulnerabilities correctly identified by PenTest tool 106 divided by the total number of security vulnerabilities identified by PenTest tool 106. For example, security application 102 may generate instructions that generate a web server on server 104 with ten security vulnerabilities. PenTest tool 106 may execute on the web server in a first test and identify eight security vulnerabilities. When it receives the security vulnerabilities identified by PenTest tool 106, security application 102 may determine that three of these identified security vulnerabilities are false positives, and that PenTest tool 106 has correctly identified five actual security vulnerabilities. Accordingly, security application 102 may determine that PenTest tool 106's precision is 5/8 (i.e., the number of security vulnerabilities correctly identified by PenTest tool 106 (five) divided by the total number of security vulnerabilities identified by PenTest tool 106 (eight)). In some cases, security application 102 may determine precision as a percentage (e.g., 62.5%).

In some embodiments, security application 102 may determine the recall of PenTest tool 106. The recall of PenTest tool 106 may be the quotient the number of security vulnerabilities correctly identified by PenTest tool 106 divided by the total number of security vulnerabilities included in the tested web server (or, in some cases, the application server or similar system or program). Using the example above, for example, security application 102 may generate instructions that generate a web server on server 104 with ten security vulnerabilities; PenTest tool 106 may, as a result of the first test described above, identify eight security vulnerabilities, of which security application 102 knows that only five are actual security vulnerabilities. Accordingly, security application 102 may determine that PenTest tool 106's recall is 5/10 (i.e., the number of security vulnerabilities correctly identified by PenTest tool 106 (five) divided by the total number of security vulnerabilities included in the tested web server (ten)). In some cases, security application 102 may determine recall as a percentage (e.g., 50%).

In some cases, PenTest tool 106 may execute on the web server generated at server 104 multiple times, and security application 102 may use the result of each of these tests to compute the distribution of PenTest tool 106's precision and/or recall. In some cases, the distribution may be computed based on PenTest tool 106 executing on a plurality of web servers generated by security application 102. For example, security application 102 may generate a plurality of instruction sets that include the same or different security vulnerabilities, and security application 102 may install the plurality of instruction sets on server 104 such that PenTest tool 106 may execute on one or more of the plurality of generated web servers. The distribution computed by security application 102 may more accurately reflect PenTest tool 106's performance. For example, in addition to PenTest tool 106 executing the first test described above, resulting in PenTest tool 106 identifying eight security vulnerabilities, three of which are false positives, out of a possible ten security vulnerabilities, PenTest tool 106 may execute additional tests on the same web server, or different web servers, generated at server 104. Based on the results of these additional tests, security application 102 may determine that a second test resulted in a precision of 66% (e.g., based on PenTest tool 106 identifying nine security vulnerabilities, three of which were false positives) and a recall of 60% (e.g., based on PenTest tool 106 correctly identifying six of the ten security vulnerabilities); security application 102 may determine that a third test resulted in a precision of 87.5% (e.g., based on PenTest tool 106 identifying eight security vulnerabilities, one of which was a false positives) and a recall of 70% (e.g., based on PenTest tool 106 correctly identifying seven of the ten security vulnerabilities). In some cases, security application may average the three precision results and average the three recall results to determine distributed precision and distributed recall results. Accordingly, security application 102 may determine that PenTest tool 106's distributed precision is 72.2% (i.e., the average of 62.5%, 66.7%, and 87.5%), and that PenTest tool 106's distributed recall is 60% (i.e., the average of 50%, 60%, and 70%). In some cases, the distribution computations may be based on a weighted average, median, or other mathematical computation.

In some cases, security application 102 may compute precision and recall results for particular security vulnerabilities. For example, in addition to evaluating PenTest tool 106's precision and recall for all security vulnerabilities that are included in a tested web server, security application 102 may further evaluate PenTest tool 106's precision and recall for a particular security vulnerability. For example, in addition to determining that PenTest tool 106's precision for all security vulnerabilities is 62.5% for all security vulnerabilities and PenTest tool 106's recall is 50% for all vulnerabilities, security application 102 may determine that PenTest tool 106's precision is 33% for a particular security vulnerability and PenTest tool 106's recall is 25% for that security vulnerability. Accordingly, security application 102 may evaluate PenTest tool 106's ability to identify all security vulnerabilities included in a generated web server as well as PenTest tool 106's ability to identify particular security vulnerabilities included in the generated web server. In some cases, a user may select the particular security vulnerability for which security application 102 is to compute performance results.

In some cases, security application 102 may determine a confidence score associated with PenTest tool 106. In some embodiments, the confidence score may be based at least in part on the number of tests that PenTest tool 106 has completed and for which security application 102 has evaluated the associated test results. For example, security application 102 may assign a higher confidence score for PenTest tool 106 when security application 102 has evaluated five tests from PenTest tool 106 than when it has evaluated just one test from PenTest tool 106. In some embodiments, the confidence score may represent security application 102's assessment of PenTest tool 106's performance in identifying a particular security vulnerability or a group of security vulnerabilities (e.g., those belonging to a vulnerability profile). For example, based on distributed precision and recall results associated with PenTest tool 106, security application 102 may determine that PenTest tool 106 should be assigned a high confidence score for a first type of security vulnerability (e.g., based on PenTest tool 106 having a distributed precision of 80% and a distributed recall of 80%) and a low confidence score for a second type of security vulnerability (e.g., based on PenTest tool 106 having a distributed precision of 50% and a distributed recall of 60%).

In some embodiments, security application 102 may generate a scorecard for PenTest tool 106. The scorecard may reflect the precision, recall, distributed precision, distributed recall, and/or confidence score results associated with PenTest tool 106. Additionally, the scorecard may include application context associated with the one or more security vulnerabilities identified by PenTest tool 106, which may indicate the types of security vulnerabilities identified by PenTest tool 106, their respective locations within the generated web server code, and any business risks associated with the security vulnerabilities. In some cases, the scorecard may include different scores for different types of security vulnerabilities based on PenTest tool 106's identification of the different types of security vulnerabilities.

In some cases, security application 102 may compare scorecards generated for different PenTest tools. In doing so, security application 102 may evaluate which PenTest tools perform better at identifying some or all security vulnerabilities requested by a user, which may involve comparing the different precision, recall, distributed precision, distributed recall, and/or confidence scores included in the respective scorecards. Based on this comparison, a user may be able to more objectively assess PenTest tools in his or her determination of which PenTest tool to perform a security audit for his or her own product.

This same system may occur with any number of security applications 102, servers 104, and PenTest tools 106. The system 100 is not limited to the number of exemplary components depicted in FIG. 1.

FIG. 2 illustrates an example method for evaluating PenTest tools, according to some embodiments of the present disclosure. Method 200 begins at step 202. At step 202, security application 102 determines if a particular security vulnerability is to be included in a web server that is to be generated for testing PenTest tool 106. Whether or not a particular security vulnerability is to be included may be based on a user's selection. For example, a user may select one or more particular security vulnerabilities from a list of security vulnerabilities to include in the generated web server, or the user may select vulnerability profiles, which indicate one or more security vulnerabilities to include in the generated web server. If security application 102 determines that a security vulnerability is not to be included in the generated web server, at step 204, security application 102 will not add the security vulnerability to an instruction set for generating the web server. If security application 102 determines that a security vulnerability is to be included in the generated web server, at step 206, security application 102 will add the security vulnerability to an instruction set for generating the web server.

At step 208, security application 102 may generate web server code according to the instruction set determined at step 206. At step 210, security application 102 may install the web server code to server 104. Accordingly, server 104 may host the web server with one or more known security vulnerabilities corresponding to those determined in step 202.

At step 212, PenTest tool 106 may execute on the web server hosted on server 104, thereby simulating a cyberattack on the web server. PenTest tool 106 may be provided by a third-party vendor. Based on its execution, PenTest tool 106 may identify one or more of the security vulnerabilities included in the web server. At step 214, security application 102 may receive the results of the PenTest test, which may include a list of the identified security vulnerabilities and any application context information (such as call path, thread, or business risk) associated with the one or more identified security vulnerabilities. In some cases, PenTest tool 106 may transmit the test results to security application 102. In other cases, PenTest tool 106 may scan the PenTest results and derive the security vulnerabilities identified by PenTest tool 106.

At step 216, security application 102 may evaluate PenTest tool 106's ability to identify security vulnerabilities in the generated web server. In some cases, this includes computing PenTest tool 106's precision in identifying some or all of the security vulnerabilities included in the generated web server. The precision of PenTest tool 106 may be the quotient the number of security vulnerabilities correctly identified by PenTest tool 106 divided by the total number of security vulnerabilities identified by PenTest tool 106. In some cases, the precision may be associated with a particular one or more security vulnerabilities. In some embodiments, security application 102 may further compute PenTest tool 106's recall of some or all of the security vulnerabilities included in the generated web server. The recall of PenTest tool 106 may be the quotient the number of security vulnerabilities correctly identified by PenTest tool 106 divided by the total number of security vulnerabilities included in the generated web server. In some cases, the recall may be associated with a particular one or more security vulnerabilities.

In some cases, security application 102 may repeat steps 202-216 one or more times. Accordingly, security application 102 may generate a plurality of instruction sets that, when installed on server 104, generate a plurality of web servers that include one or more security vulnerabilities. PenTest tool 106 may execute on one or more of the plurality of web servers one or more times, and security application 102 may receive several additional sets of PenTest results from PenTest tool 106. Security application 102 may evaluate these additional sets of PenTest results and, according to one or more mathematical operations (e.g., average, weighted average, or median computations), determine distributed precision and/or distributed recall for PenTest tool 106. The distributed precision and/or distributed recall computations may reflect PenTest tool 106's performance over multiple tests, thus conveying a more complete view of PenTest tool 106's ability to identify one or more security vulnerabilities in the generated web server. In some cases, security application 102 may further compute a confidence score associated with the one or more evaluations made by security application 102. A higher confidence score may be associated with security application's confidence in its evaluations and may be based on, for example, repeated evaluations of different test result sets received from PenTest tool 106.

At step 218, security application 102 may generate a scorecard for PenTest tool 106. The scorecard may reflect the precision, recall, distributed precision, distributed recall, and/or confidence score results associated with PenTest tool 106. Additionally, the scorecard may include application context associated with the one or more security vulnerabilities identified by PenTest tool 106, which may indicate the types of security vulnerabilities identified by PenTest tool 106, their respective locations within the generated web server code, and any business risks associated with the security vulnerabilities. In some cases, the scorecard may include different scores for different types of security vulnerabilities based on PenTest tool 106's identification of the different types of security vulnerabilities.

Various embodiments may perform some, all, or none of the steps described above. Furthermore, certain embodiments may perform these steps in a different order or in parallel. While discussed as security application 102, server 104, and PenTest tool 106 as performing the steps of this method, any suitable component of system 100 may perform one or more steps of the method.

FIG. 3 illustrates an example of a computer system, in accordance with certain embodiments. In particular embodiments, one or more computer systems 300 provide functionality described or illustrated herein. As an example, one or more computer systems 300 may be used to provide at least a portion of a security application 102, server 104, and penetration testing tool 106 described with respect to FIG. 1. As another example, one or more computer systems 300 may be used to perform one or more steps described with respect to FIG. 3. In particular embodiments, software running on one or more computer systems 300 provides functionality described or illustrated herein or performs one or more steps of one or more methods described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example, and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate.

Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A method, comprising:
generating a plurality of instructions, wherein the instructions comprise one or more security vulnerabilities for testing a web server, wherein the one or more security vulnerabilities are selected from a group of available security vulnerabilities;
compiling, based on the plurality of instructions, the web server, wherein code associated with the web server comprises the plurality of instructions that comprise the one or more selected security vulnerabilities;
receiving a penetration test result from a penetration testing tool executing on the web server; and
computing a precision of the penetration testing tool based on the received penetration test result, wherein the received penetration test result indicates detection by the penetration testing tool of the one or more selected security vulnerabilities.

2. The method of claim 1, wherein computing the penetration testing tool's precision further comprises determining a quotient of a number of security vulnerabilities correctly identified by the penetration testing tool divided by a total number of security vulnerabilities identified by the penetration testing tool.

3. The method of claim 2, wherein the total number of security vulnerabilities includes false positives identified by the penetration testing tool.

4. The method of claim 1, further comprising:
calculating a confidence score for the penetration testing tool.

5. The method of claim 4, wherein calculating the confidence score further comprises computing a distribution of precision results based on receiving a plurality of penetration test results from the penetration testing tool.

6. The method of claim 1, further comprising:
generating a scorecard for the penetration testing tool based at least in part on the computed precision.

7. The method of claim 1, further comprising:
computing a recall of the penetration testing tool to detect the one or more selected security vulnerabilities based on determining a quotient of the number of security vulnerabilities correctly identified by the penetration testing tool divided by a total number of security vulnerabilities included in the web server.

8. A system, comprising:
one or more processors; and
one or more computer-readable non-transitory storage media comprising instructions that, when executed by the one or more processors, cause one or more components of the system to perform operations comprising:
generating a plurality of instructions, wherein the instructions comprise one or more security vulnerabilities for testing a web server, wherein the one or more security vulnerabilities are selected from a group of available security vulnerabilities;
compiling, based on the plurality of instructions, the web server, wherein code associated with the web server comprises the plurality of instructions that comprise the one or more selected security vulnerabilities;
receiving a penetration test result from a penetration testing tool executing on the web server; and
computing a precision of the penetration testing tool based on the received penetration test result, wherein the received penetration test result indicates detection by the penetration testing tool of the one or more selected security vulnerabilities.

9. The system of claim 8, wherein computing the penetration testing tool's precision further comprises determining a quotient of a number of security vulnerabilities correctly identified by the penetration testing tool divided by a total number of security vulnerabilities identified by the penetration testing tool.

10. The system of claim 9, wherein the total number of security vulnerabilities includes false positives identified by the penetration testing tool.

11. The system of claim 8, further comprising:
calculating a confidence score for the penetration testing tool.

12. The system of claim 11, wherein calculating the confidence score further comprises computing a distribution of precision results based on receiving a plurality of penetration test results from the penetration testing tool.

13. The system of claim 8, further comprising:
generating a scorecard for the penetration testing tool based at least in part on the computed precision.

14. The system of claim 8, further comprising:
computing a recall of the penetration testing tool to detect the one or more selected security vulnerabilities based on determining a quotient of the number of security vulnerabilities correctly identified by the penetration testing tool divided by a total number of security vulnerabilities included in the web server.

15. One or more computer-readable non-transitory storage media embodying instructions that, when executed by a processor, cause performance of operations comprising:
generating a plurality of instructions, wherein the instructions comprise one or more security vulnerabilities for testing a web server, wherein the one or more security vulnerabilities are selected from a group of available security vulnerabilities;
compiling, based on the plurality of instructions, the web server, wherein code associated with the web server comprises the plurality of instructions that comprise the one or more selected security vulnerabilities;
receiving a penetration test result from a penetration testing tool executing on the web server; and
computing a precision of the penetration testing tool based on the received penetration test result, wherein the received penetration test result indicates detection by the penetration testing tool of the one or more selected security vulnerabilities.

16. The one or more computer-readable non-transitory storage media of claim 15, wherein computing the penetration testing tool's precision further comprises determining a quotient of a number of security vulnerabilities correctly identified by the penetration testing tool divided by a total number of security vulnerabilities identified by the penetration testing tool.

17. The one or more computer-readable non-transitory storage media of claim 16, wherein the total number of security vulnerabilities includes false positives identified by the penetration testing tool.

18. The one or more computer-readable non-transitory storage media of claim 15, the operations further comprising:
calculating a confidence score for the penetration testing tool.

19. The one or more computer-readable non-transitory storage media of claim 18, wherein calculating the confidence score further comprises computing a distribution of precision results based on receiving a plurality of penetration test results from the penetration testing tool.

20. The one or more computer-readable non-transitory storage media of claim 15, the operations further comprising:
generating a scorecard for the penetration testing tool based at least in part on the computed precision.

* * * * *